United States Patent [19]
Stevens et al.

[11] Patent Number: 5,712,034
[45] Date of Patent: Jan. 27, 1998

[54] CABLES PROTECTED AGAINST CORROSION FOR A RUBBER ARTICLE

[75] Inventors: Hendrik Stevens; Bernd Kaiser, both of Hanover; Klaus Kleinhoff, Rodenberg, all of Germany

[73] Assignee: Continental Aktiengesellschaft, Hanover, Germany

[21] Appl. No.: 671,399

[22] Filed: Jun. 26, 1996

[30] Foreign Application Priority Data

Jun. 27, 1995 [DE] Germany ............ 195 23 256.9

[51] Int. Cl.$^6$ ............ D02G 3/00; B60C 9/00; F16G 1/00; B32B 15/00
[52] U.S. Cl. ............ 428/375; 428/380; 428/381; 428/379; 152/451; 152/565; 474/260; 474/268; 474/271
[58] Field of Search ............ 428/373, 378, 428/380, 381, 379, 389, 382, 390, 396; 152/565, 451; 474/260, 268, 271; 156/910

[56] References Cited

U.S. PATENT DOCUMENTS

| | | | |
|---|---|---|---|
| 4,333,785 | 6/1982 | Erickson | 152/565 |
| 4,333,787 | 6/1982 | Erickson | 152/565 |
| 4,446,198 | 5/1984 | Shemenski et al. | 152/565 |
| 4,677,033 | 6/1987 | Coppens et al. | 152/565 |

FOREIGN PATENT DOCUMENTS

| | | |
|---|---|---|
| 0470280 | 2/1992 | European Pat. Off. |
| 0530445 | 3/1993 | European Pat. Off. |
| 9314166 | 7/1993 | European Pat. Off. |
| 3729566 | 3/1989 | Germany . |
| 3834526 | 4/1990 | Germany . |

OTHER PUBLICATIONS

Industrie Anzeiger, vol. 50/94 pp. 37–39.
Advanced Materials 1994/6, No. 3, pp. 226, 228.

*Primary Examiner*—Newton Edwards
*Attorney, Agent, or Firm*—Robert W. Becker & Associates

[57] ABSTRACT

A rubber article has a body consisting of rubber and a reinforcement structure with cables embedded in the rubber body. The cables have at least one inner layer with at least one first filament wherein at least one first filament consists of a metallic alloy. The outermost layer has second filaments embedded adhesively in the rubber body. All of the first and second filaments that consist of a metallic alloy are coated with a corrosion-protective coating. The corrosion-protective coating for at least one of the first filaments consists of an intrinsically conductive polymer.

5 Claims, 2 Drawing Sheets

CABLES PROTECTED AGAINST CORROSION FOR A RUBBER ARTICLE

BACKGROUND OF THE INVENTION

The present invention relates to a rubber article with a reinforcement structure consisting of cables which are grouped into at least two layers whereby at least one filament of an inner layer is comprised of a metallic alloy, whereby at least the filaments of the outermost layer of the cable are embedded adhesively in the surrounding rubber, optionally by using a bonding agent such as, for example, brass, whereby all filaments consisting of a metallic alloy are coated with a coating that protects against corrosion.

From German Offenlegungsschrift 37 29 566 a powder consisting of an intrinsically conductive polymer is known. It can be used for manufacturing electrical semiconductors or housings of electrical devices that must be protected against electric charges or for the manufacture of electrical capacitors.

From European patent 0 623 159 a corrosion-protective coating is known in which an intrinsically conductive polymer is dispersed, preferably polyaniline. The bonding agent is selected from a chemical class of materials of substantially non-conducting alkydes, vinyls, vinylidene-chloride, fluoro epoxyde, unsaturated esters, heat-curing acrylates, phenols, and polyurethanes. These coatings are to be applied preferably onto the blank metal to be protected against corrosion and should have good adhesion characteristics thereon.

The permanency of such a corrosion protection is said to be good even without the addition of conventional additives such as zinc dust acting as a sacrificial anode, which additives in view of health and environmental considerations are undesirable.

In the journal "Industrie Anzeiger", vol. 50/94, pages 37 to 39, the effect of polyaniline as a corrosion-protective material is disclosed in more detail especially in the right column of page 37, and this article especially illustrates that the development initiated already in 1985 by the publication by David DeBerry in *J. Electrochem. Soc.*, 1985/132, 1022 has resulted in technically applicable, but very expensive lacquers. A similar teaching can be taken from the publication by Mr. Wessling in *Advanced Materials*, 1994/6, No. 3, pages 226 to 228.

It is furthermore known that instead of the preferred polyanilines its radical cation salt can also be used. Therefore, in context of the present invention polyanilin is meant to encompass such derivaties also.

It is therefore an object of the present invention to make use of the excellent corrosion-protective effects of intrinsically conductive polymers, especially polyaniline, also for rubber articles with a reinforcement structure of cables to be protected against corrosion.

SUMMARY OF THE INVENTION

In a first attempt, the steel cables were coated with already available polyaniline lacquers, which attempt was successful, the resulting coated steel cables were embedded in rubber, which was also successful, and, subsequently, experimental tires were built. However, these tires did not hold up. Thus, the specially formulated object of the present invention is to increase the service life of the resulting rubber article.

The rubber article according to the present invention is primarily characterized by:

A body comprised of rubber;

A reinforcement structure with cables embedded in the body;

The cables having at least one inner layer and an outermost layer;

The at least one inner layer comprising at least one first filament with at least one first filament consisting of a metallic alloy;

The outermost layer comprising second filaments embedded adhesively in the rubber;

Wherein all of the first and second filaments that consist of a metallic alloy are coated with a corrosion-protective coating;

Wherein the corrosion protective coating for at least one of the first filaments comprises an intrinsically conductive polymer.

Advantageously, the intrinsically conductive polymer is selected from the group consisting of polyaniline and polyaniline derivitives.

At least some of the first filaments consist of steel.

The first filaments coated with the corrosion-protective coating of intrinsically conductive polymer comprise a copper-containing or zinc-containing coating beneath the corrosion-protective coating.

The present invention also relates to a method for applying an intrinsically conductive polymer onto a metallic surface. The method inventively comprises the steps of preparing a dispersion of the intrinsically conductive polymer and applying the dispersion onto the metallic surface to be coated at a pressure of at least 4 bar.

Preferably, the metallic surface is a wire produced by a wire drawing process and the dispersion is a lubricating drawing aid at least for the last drawing die of the wire drawing process.

Preferably, the step of preparing the lubricating drawing aid includes the steps of dispersing the intrinsically conductive polymer in a lubricant for the wire drawing process and emulsifing the intrinsically conductive polymer dispersed in the lubricant in water for application in the drawing die. The lubricant is selected from the group consisting of oil, grease, and fatty acids.

Preferably, the step of preparing the lubricating drawing aid includes the step of dispersing the intrinsically conductive polymer in isopropanol and applying the resulting dispersion onto the inlet of at least the last drawing die, and further comprising the step of providing in the vicinity of the drawing die an inert atmosphere.

The gas for the inert gas atmosphere is preferably selected from at least one of the gases carbon dioxide, nitrogen, and a noble gas.

According to the present invention, at least some filaments of the inner layer or inner layers is protected against corrosion by a coating that contains an intrinsically conductive polymer while the other filaments, in a manner known per se, are protected against corrosion, for example, by a brass coating.

The inventive solution is based on extended testing showing that only the adhesion of the polyaniline-containing coating at the metal wire (filaments) exhibits a sufficient load change resilience, but not the adhesion of the polyaniline-containing coating at the rubber. After this particular hypothesis, which is one of many postulated for explaining the failure of the experimental tires, had been confirmed by testing, it was first tried to improve the adhesion properties. However, this has to this day not resulted in sufficient advances. The gist of the present invention is that the outer filaments (wires) of the metal cables are conventionally coated with a preferably copper-containing alloy which is, as is well known in the art, an excellent bonding agent to the rubber materials conventionally used for tire construction and that only farther inwardly positioned filaments must be coated with the intrinsically conductive polymer. Surprisingly, the use of the modern organic corrosion protection only on the inner filaments exhibits substantially the same excellent corrosion-protective effect as a treatment of all, i.e., including the exterior, filaments.

As of yet it has not been unequivocally resolved how the advantageous and surprising improvement of the corrosion protection, inclusive the exterior filaments, comes about, even though inventively the exterior filaments are only conventionally coated.

It has been suggested by researchers that the small contact surface area between the side of the outer filaments facing the center of the cable cross-section and the intrinsically conductive coating on the inner filaments provides sufficient electrical conductivity for all members in contact. The thus possible electron exchange does not impede the rubber adhesion of the conventionally coated outer filaments.

The intrinsically conductive polymer is advantageously polyaniline or its derivaties. With this material the most useful dispersions and emulsions have been prepared to date.

As is known in general, it is desirable that in the inventive rubber article at least some of the filaments coated with the intrinsically conductive polymer should consist of steel.

It is possible to apply the intrinsically conductive polymer coating directly onto the inner metal alloy filament, preferably comprised of steel. As is known in the art, an excellent bonding effect is thus generated. In a preferred embodiment, the filament coated with the intrinsically conductive polymer comprises beneath this polymer coating a copper-containing layer. This simplifies substantially the manufacturing logistics in the steel cord production because all filaments can simply be coated with brass or similar materials and only thereafter the selective treatment, i.e., the coating with polyaniline etc., must be applied. Furthermore, by doing so no quality problems due to intermediate corrosion will occur between the wire drawing and wire patenting process, in which considerably temperatures can be reached.

For the same reasons, it may also be expedient that the filaments coated with the intrinsically conductive polymer are provided with a zinc-containing layer beneath the polymer coating, preferably instead of, but also possibly in addition to, the copper-containing layer.

In order to apply an intrinsically conductive polymer to a metallic surface, it is known to produce first a dispersion of the intrinsically conductive polymer and to submerge the surface to be coated in the dispersion, optionally repeatedly with intermediate drying. In order to be able to perform this method with sufficient speed in a reliable manner, it is suggested in a development of this known method to apply the intrinsically conductive polymer at a pressure of at least 4 bar. Preferably, the intrinsically conductive polymer is added as a lubricant to the drawing aid for at least the last drawing die of the wire drawing process.

In order to apply the intrinsically conductive polymer onto a metallic surface, preferably coated with a copper alloy, in a simple manner, the intrinsically conductive polymer is first dispersed in a lubricant suitable for the wire drawing process such as an oil or a fatty acid or a grease etc. and this lubricant enriched with the intrinsically conductive polymer is subsequently emulsified in a manner known per se with water and applied to the inlet of the drawing die. For the wire drawing operator the only apparent change of the conventional method steps is that a different lubricant, i.e., a lubricant containing the intrinsically conductive polymer, is to be used and the wire batch that is produced such must be kept separate until sold from other wire batches produced with conventional drawing aids such as conventional oil-water emulsions.

Especially simple is the manufacture of such dispersions of the intrinsically conductive polymer which are to be applied onto a metallic, preferably copper-alloy-coated surface, when the intrinsically conductive polymer is first dispersed in isopropanol and this dispersion is then used as a lubricant at the inlet of the drawing die, at least at the last one of the drawing dies, optionally also at the second to last drawing die. For preventing any fire danger in regard to the easily inflammable isopropanol, it is suggested to produce in the vicinity of the drawing die an inert protective gas atmosphere, preferably comprised of $CO_2$ and/or nitrogen and/or a noble gas. Technically and economically feasible gas mixtures as well as the respective outflow rates as a function of the distance of the protective gas nozzle from the potential fire hazard location are available to the person skilled in the art from the area of welding under protective gas atmospheres which at present are performed almost in any automechanic's shop.

BRIEF DESCRIPTION OF THE DRAWINGS

The object and advantages of the present invention will appear more clearly from the following specification in conjunction with the accomapnying drawings, in which.

DESCRIPTION OF PREFERRED EMBODIMENTS

The present invention will now be described in detail with the aid of several specific embodiments utilizing FIGS. 1 and 2.

Figure 1:
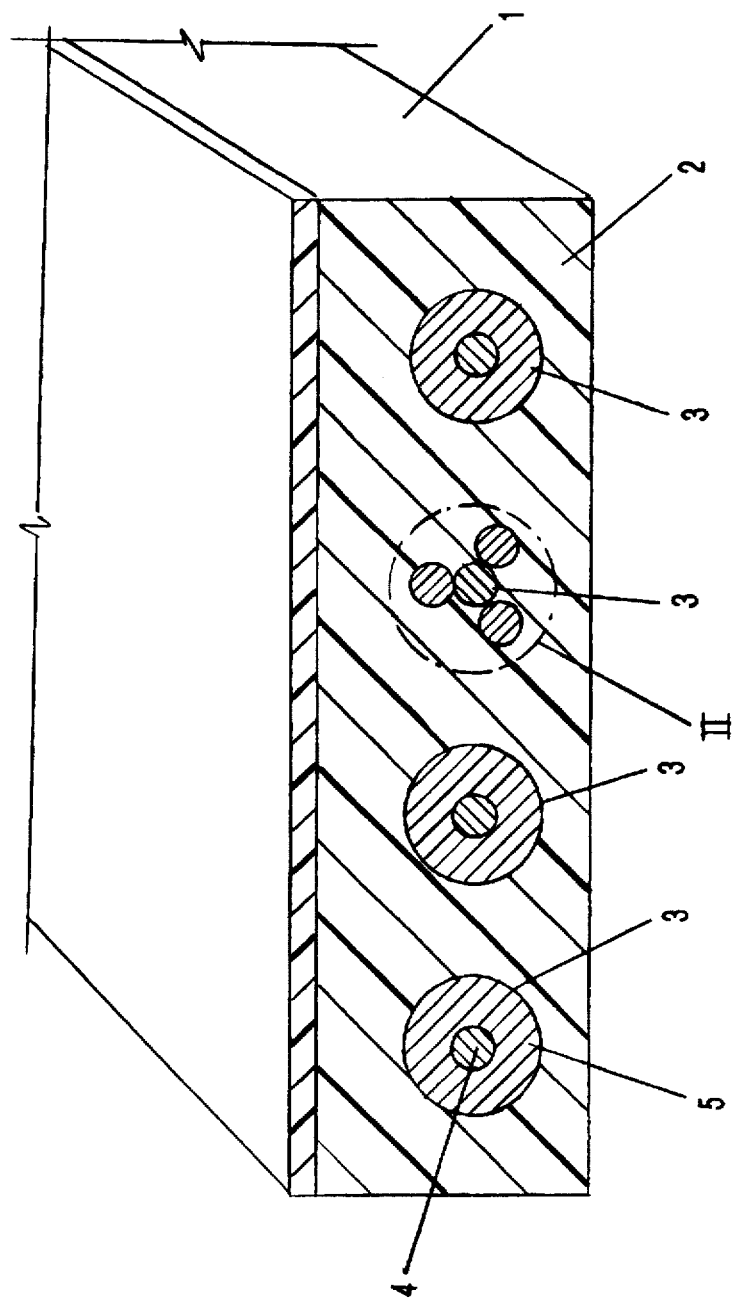
FIG. 1 shows a rubber article, here a conveyor belt, in a perspective cross-sectional view with a plurality of embedded steel cables.

FIG. 1 shows a rubber article 1, here a conveyor belt, in a perspective cross-sectional view with a plurality of steel cables 3 embedded therein. These steel cables 3 serve to provide a sufficient pulling resistance and pulling stiffness while maintaining at the same time excellent bending (flexing) properties.

For similar reasons such steel cables are also used for reinforcing other rubber articles. For example, they are used in belt plies of pneumatic vehicle tires with radial carcasses and in carcasses of heavy tires, especially truck and airplane tires of radial construction.

The steel cables 3 used in the shown embodiment are grouped into only two layers, an inner layer 4 and an outer layer 5. A cross-section of one of the steel cables 3 which are identical to one another is shown as a detail II and, isolated from the surrounding rubber 2, is shown in even greater detail in FIG. 2.

Figure 2:
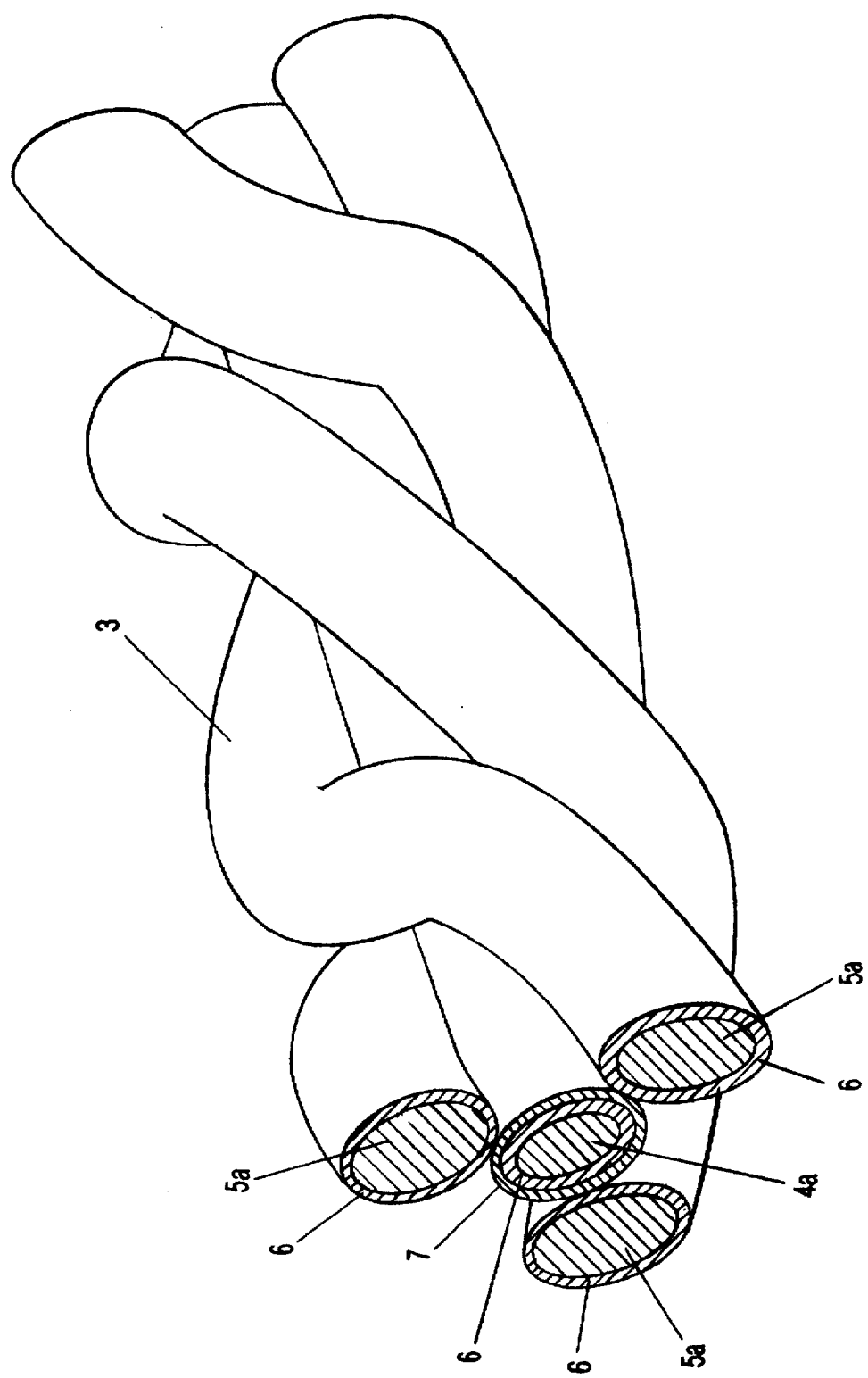
FIG. 2 shows a perspective enlarged view of FIG. 1 illustrating in section the isolated steel cable.

The detail II and FIG. 2, showing a perspective cross-sectional view, illustrate that in this embodiment the inner layer 4 is comprised of a single uncoiled (straight) wire $4a$, preferably consisting of steel which is generally referred to as the core, and the outer layer 5 is comprised of three wires $5a$ which are wound or coiled about the core $4a$.

Corrosion will result when the rubber layer or layers protecting the steel cable 3 against the environment are damaged. This happens in vehicle tires especially within the tread strip area and sometimes also within the sidewall area. With conveyor belts this occurs on the side facing the material to be conveyed. Due to such damages, corrosion results accelerated by bending loads, with a stiffness decrease in the damaged area. The corrosion at the damaged area is only a primary effect. Slowly, a secondary effect, detachment of the adhered rubber from the metallic surface, is observed which is caused by an increase in volume due to oxygen uptake at the edges of the primary corrosion location, and the resulting wedge effect. Moisture will enter the gap and penetrate along the wire surface.

A considerable slowing of the electrochemical corrosion, especially of the so-called secondary effect, is inventively achieved by providing at least some filaments of the inner cable layer, in the shown embodiment of the single core wire 4a, instead of or preferably in addition to the known coating 6 with a copper-containing alloy, with a coating containing an intrinsically conductive polymer. The adhesion of the inner cable layer 4, i.e., the core of the wire 4a is of minimal importance for the bonding action of the entire steel cable 3 within the surrounding rubber 2. FIG. 1 shows that for certain rubber article constructions the surrounding rubber does not even completely penetrate to the core of the cable so that there is no adhesion between the rubber and the core in any case. At least the wires (filaments) of the outermost layer i.e., in the shown embodiment the three wires 5a of the single outermost layer 5, are conventionally provided with a metallic surface that ensures a good adhesion to the surrounding rubber 2. For this purpose, the copper-containing coating 6 is, for example, provided.

In summarizing the above, the invention relates to a rubber article with a reinforcement structure with cables comprised of at least two layers of grouped filaments (wires) whereby at least one wire of an inner layer is comprised of a metallic alloy and at least the filaments of the outer layer of the cable are embedded in an adhesive manner in the surrounding rubber, optionally by using a bonding agent such as, for example, brass, whereby all of the filaments comprised of a metal alloy are coated with a corrosion-protective coating. In order to improve the corrosion protection while at the same time providing sufficient adhesion to the surrounding rubber, at least some filaments of the inner layer or layers are protected against corrosion by a coating containing an intrinsically conductive polymer while the other filaments, especially those of the outermost layer are protected against corrosion in a manner known per se, for example, by a brass coating.

By maintaining in the inventive rubber article the corrosion protection known from the prior art at least for the filaments of the outermost layer by means of a coating of copper-containing and/or zinc-containing alloys, the rubber article is provided at the same time with a proven adhesive action between rubber and cable.

The present invention is, of course, in no way restricted to the specific disclosure of the specification and drawings, but also encompasses any modifications within the scope of the appended claims.

What we claim is:

1. A cable comprising:

at least one inner layer, wherein said inner layer comprises one or more first filaments;

an outermost layer, wherein said outermost layer comprises one or more second filaments;

at least one of said first filaments consists of a metallic alloy and at least one of said second filaments consists of a metallic alloy;

said second filaments are capable of adhesion to rubber;

all of said first filaments that consist of a metallic alloy comprise a corrosion-protective coating;

all of said second filaments that consist of a metallic alloy comprise a corrosion-protective coating;

said corrosion-protective coating of at least one of said first filaments that consist of a metallic alloy contains an intrinsically conductive polymer but said corrosion-protective coating of said second filaments does not contain an intrinsically conductive polymer.

2. A cable according to claim 1, wherein said intrinsically conductive polymer is selected from the group consisting of polyaniline and polyaniline derivatives.

3. A cable according to claim 1, wherein said metallic alloy of said at least one first filament is steel.

4. A cable according to claim 1, wherein said first filaments coated with said corrosion-protective coating of said intrinsically conductive polymer further comprise a coating of a copper-containing alloy beneath said corrosion-protective coating of said intrinsically conductive polymer.

5. A cable according to claim 1, wherein said first filaments coated with said corrosion-protective coating of said intrinsically conductive polymer further comprise a coating of a zinc-containing alloy beneath said corrosion-protective coating of said intrinsically conductive polymer.

* * * * *